United States Patent
Badger et al.

(10) Patent No.: US 10,148,816 B2
(45) Date of Patent: Dec. 4, 2018

(54) INTERACTIVE VOICE RESPONSE (IVR) CALL AUTHENTICATION

(71) Applicant: Verizon Patent and Licensing Inc., Arlington, VA (US)

(72) Inventors: Brian S. Badger, Divide, CO (US); Thomas G. Smith, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/438,131

(22) Filed: Feb. 21, 2017

(65) Prior Publication Data
US 2018/0241879 A1 Aug. 23, 2018

(51) Int. Cl.
| H04M 1/64 | (2006.01) |
| H04M 3/493 | (2006.01) |
| H04L 29/08 | (2006.01) |
| H04L 29/06 | (2006.01) |
| H04M 7/00 | (2006.01) |

(52) U.S. Cl.
CPC .......... *H04M 3/493* (2013.01); *H04L 65/608* (2013.01); *H04L 67/20* (2013.01); *H04M 7/0039* (2013.01); *H04M 2203/256* (2013.01); *H04M 2203/60* (2013.01)

(58) Field of Classification Search
CPC ....... H04M 2201/12; H04M 2203/651; H04M 3/382; H04M 3/42
USPC ............................................ 379/88.01–88.19
See application file for complete search history.

(56) References Cited

U.S. PATENT DOCUMENTS

| 8,265,234 B2* | 9/2012 | Singh | H04M 1/247 379/88.04 |
| 2008/0304650 A1* | 12/2008 | Catlin | H04M 3/24 379/298 |
| 2010/0189228 A1* | 7/2010 | Seyfetdinov | H04M 3/42 379/88.14 |
| 2011/0286584 A1* | 11/2011 | Angel | H04M 3/42221 379/88.02 |
| 2014/0037074 A1* | 2/2014 | Bravo | H04W 12/06 379/88.01 |

(Continued)

OTHER PUBLICATIONS

TRUSTid, "ID Card Design & Management Software," http://trustidsoft.com/, Aug. 23, 2013, 6 pages.

(Continued)

*Primary Examiner* — Solomon G Bezuayehu

(57) ABSTRACT

A device can receive, from an interactive voice response (IVR) system, a set of instructions to initiate an application session of an application and to provide an authentication interface for display. The device can receive, via the authentication interface and during the application session, a first credential from a user of the device. The device can authenticate, during the application session, the first credential. The device can receive, from a third-party server device and during the application session, a second credential. The device can cause, during the application session, a communication session to be established with the IVR system to request the account information. The communication session can include a telephone call established between the application and the IVR system. The device can receive the account information from the IVR system via the application session. The device can provide the account information for display via a display of the device.

20 Claims, 7 Drawing Sheets

(56) References Cited

U.S. PATENT DOCUMENTS

2016/0119348 A1* 4/2016 Kus .................. H04L 63/10
                                                                     726/1

OTHER PUBLICATIONS

TRUSTId, "Automatic Caller Authentication," https://www.trustid.com/, Jun. 7, 2014, 4 pages.

* cited by examiner

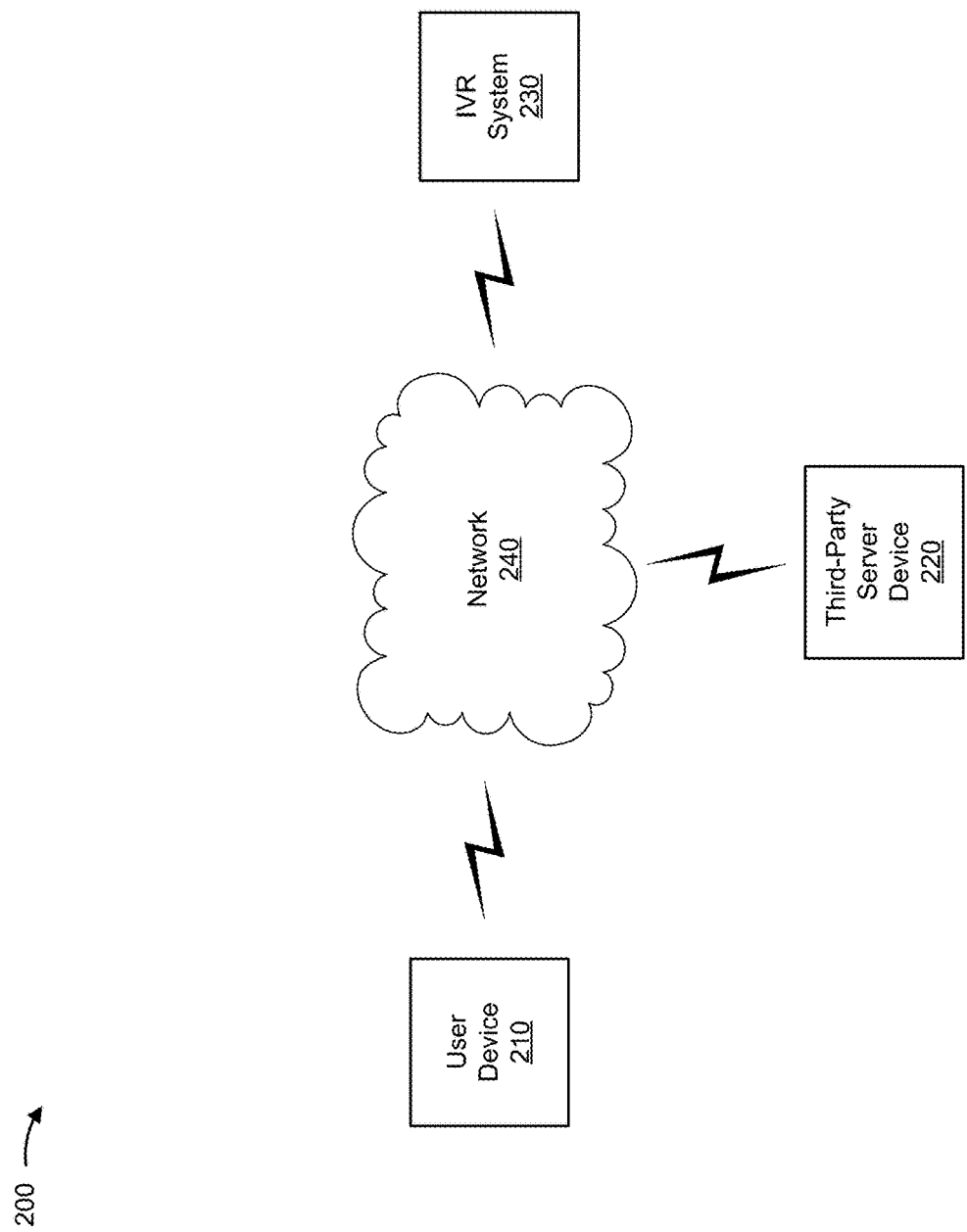

INTERACTIVE VOICE RESPONSE (IVR) CALL AUTHENTICATION

BACKGROUND

Interactive voice response (IVR) is a technology that allows a computer to interact with humans through the use of voice and dual-tone multi-frequency signaling (DTMF) tones input via keypad. IVR technology allows customers to interact with a company's host system via a telephone keypad or by voice, after which services can be inquired about through an IVR dialogue. IVR systems can respond with prerecorded or dynamically generated audio to further direct users on how to proceed.

BRIEF DESCRIPTION OF THE DRAWINGS

FIG. 2 is a diagram of an example environment in which systems and/or methods, described herein, can be implemented;

DETAILED DESCRIPTION OF PREFERRED EMBODIMENTS

The following detailed description of example implementations refers to the accompanying drawings. The same reference numbers in different drawings can identify the same or similar elements.

A customer can call an IVR system associated with an entity (e.g., a bank, a school, a retailer, a government agency, a business, etc.) to access information related to the customer. As part of calling the IVR system and obtaining access to the information, the customer might need to provide sensitive information to verify the identity of the customer, such as birth date, social security number, mother's maiden name, name of first pet, a personal identification number, a password, and/or the like. The customer might also need to verbalize this sensitive information and/or submit the sensitive information to the IVR system via a keypad of a user device. This can be cumbersome, unsecure, and can reduce confidence that the person providing the sensitive information is the customer (e.g., the owner of the sensitive information or the person with which the sensitive information is associated).

Implementations described herein enable secure authentication of a customer's identity via an application installed on the customer's user device, and enable secure reconnection of communications with an IVR system, or another device (e.g., a device of a customer support representative), via the application. In this way, implementations described herein increase security of providing sensitive information to the IVR system, or the other device, obtaining sensitive information from the IVR system, or the other device, and/or conducting a transaction, and reduce or eliminate particular threats to communications with an IVR system, or another device, such as man-in-the-middle-attacks. Furthermore, implementations described herein increase ease of providing sensitive information to the IVR system, or another device, obtaining sensitive information from the IVR system, or the other device, and/or conducting a transaction, thereby increasing efficiency. Furthermore, implementations described herein increase confidence that the person providing the sensitive information, obtaining the sensitive information, and/or conducting the transaction based on verification of the sensitive information is the owner of the sensitive information and can be permitted to access the IVR system, can be permitted to connect to a device of a customer support representative, and/or the like.

Figure 1A:
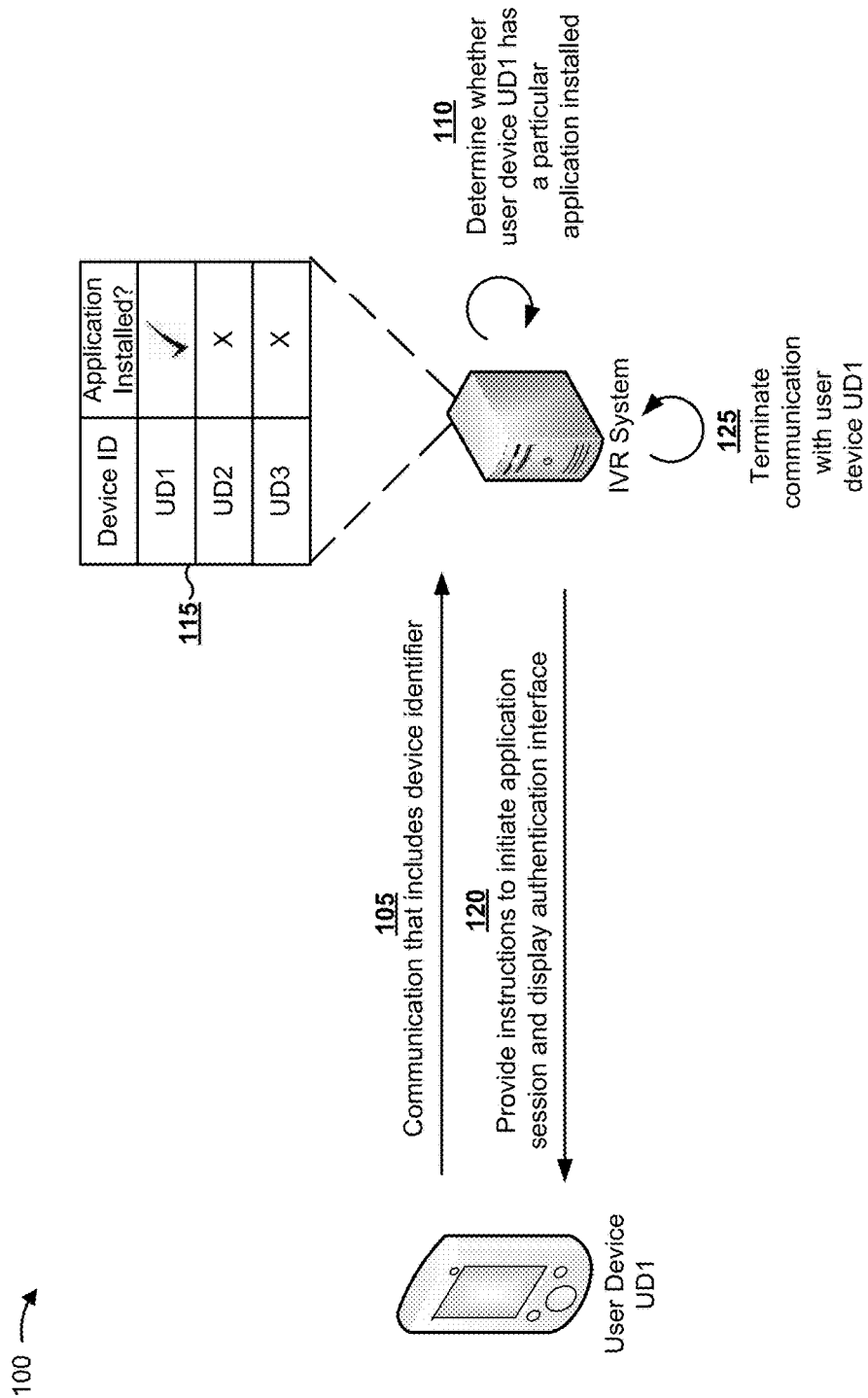
FIGS. 1A-1C are diagrams of an overview of an example implementation described herein.
Figure 1B:
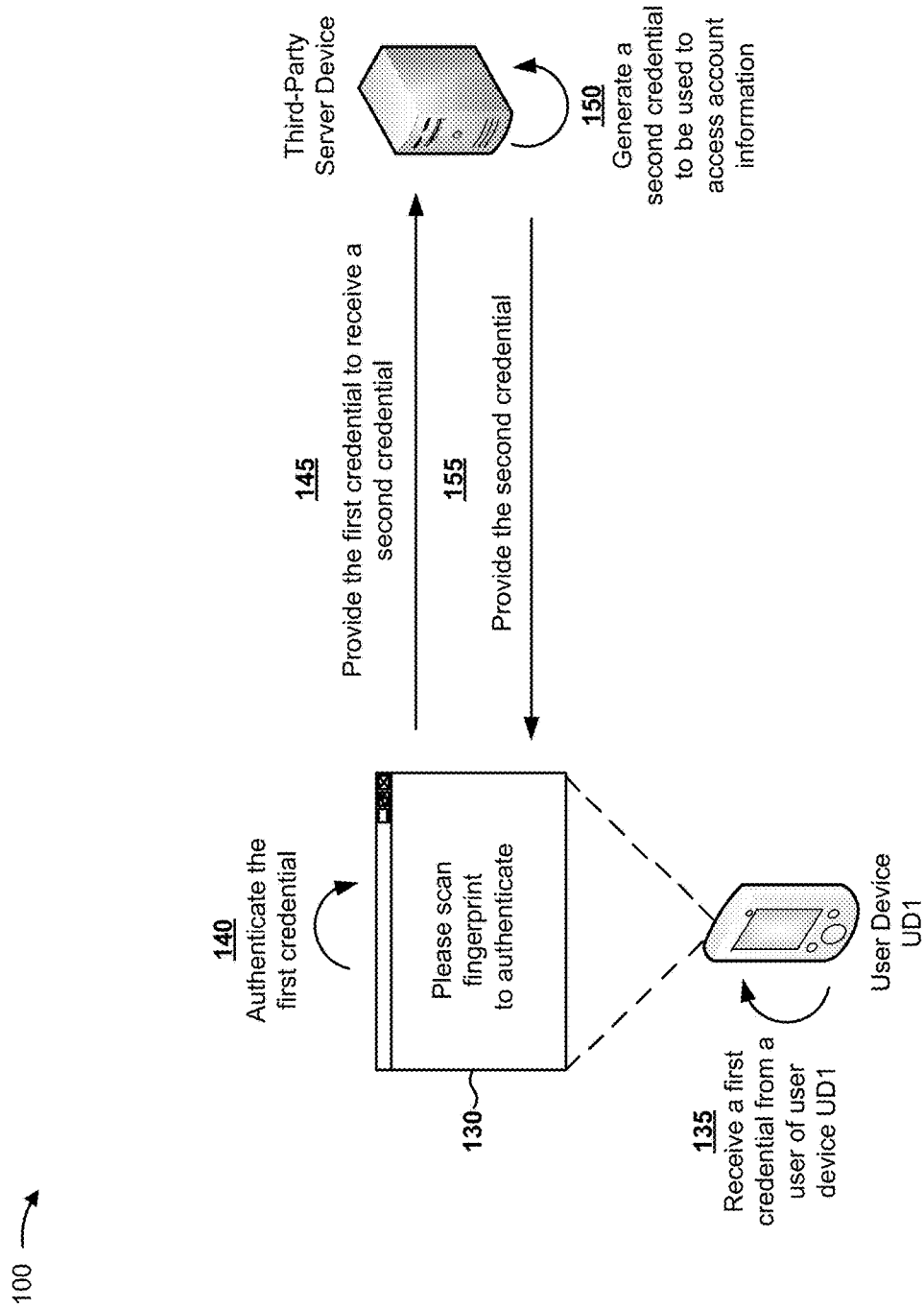
Figure 1C:
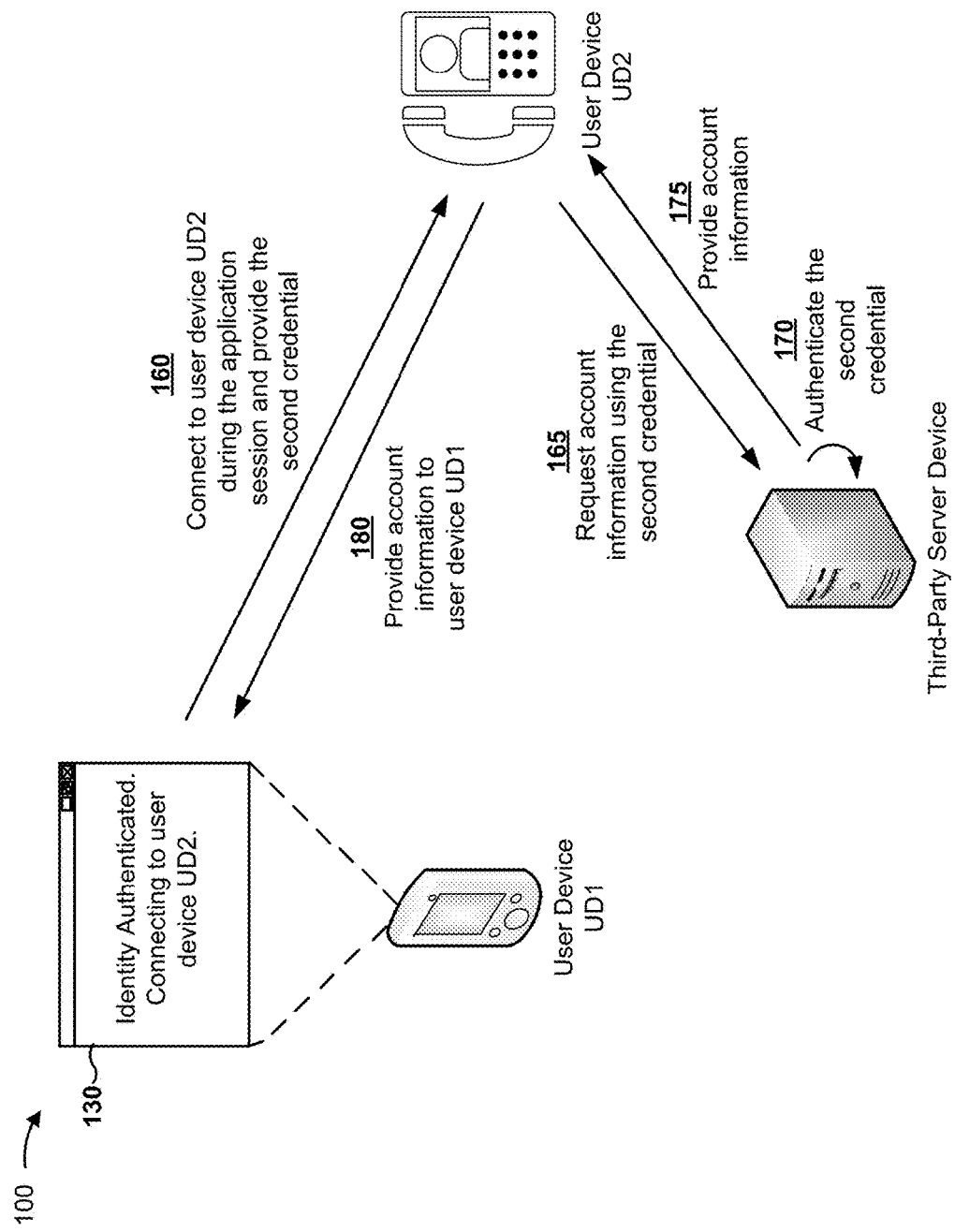

FIGS. 1A-1C are diagrams of an overview of an example implementation 100 described herein. As shown in FIGS. 1A-1C, example implementation 100 includes a user device UD1, a user device UD2 (shown in FIG. 1C), an IVR system (shown in FIG. 1A), and a third-party server device (shown in FIGS. 1B and 1C). As shown in FIG. 1A, and by reference number 105, user device UD1 can provide a communication to the IVR system. For example, user device UD1 can make a call to the IVR system, send a text message to the IVR system, and/or the like. The communication can include a device identifier that identifies user device UD1.

As shown by reference number 110, the IVR system can determine whether user device UD1 has a particular application installed (e.g., a mobile banking application for a bank or a customer account application for another type of entity) using the device identifier. For example, as shown by reference number 115, the IVR system can look up the device identifier of user device UD1 in a data structure that associates device identifiers (e.g., shown as "Device ID") with information indicating whether the particular application is installed on various user devices identified by the device identifiers (e.g., shown as "Application Installed?"). In this case, the IVR system can determine that user device UD1 has the application installed.

As shown by reference number 120, when the IVR system determines that user device UD1 has the application installed, the IVR system can provide instructions to user device UD1 to initiate an application session for the application. In addition, the instructions can be related to having user device UD1 provide an authentication interface of the application for display. As shown by reference number 125, after providing instructions to initiate the application session, the IVR system can terminate the initial communication with user device UD1 (e.g., disconnect a call from user device UD1). In this way, the IVR system terminates a potentially unsecure/unauthenticated communication so that a subsequent secure/authenticated communication can be established.

As shown in FIG. 1B, and by reference number 130, user device UD1 can display an authentication interface instructing a user of user device UD1 to provide a first credential (e.g., a fingerprint, username/password combination, or another type of information that can be used to authenticate the user). As shown by reference number 135, user device UD1 can receive the first credential from the user of user device UD1 (e.g., when the user scans a fingerprint or inputs a username/password combination). As shown by reference number 140, user device UD1 can authenticate the first credential using the application by comparing the first credential to information stored on user device UD1.

As shown by reference number 145, user device UD1 can provide the first credential (or information indicating that the first credential was authenticated) to a third-party server device, such as to receive a second credential from the third-party server device. As shown by reference number 150, the third-party server device can generate a second credential to be used by user device UD1, or another device, to access account information for the user of user device UD1 (e.g., a temporary credential, such as a one-time credential, a credential that is valid for a limited amount of time, an access key, a session token, etc.). In addition, the second credential can be used to authenticate a telephone call, or another type of connection, from user device UD1 to the IVR system, to user device UD2, or another device. As shown by reference number 155, the third-party server device can provide the second credential to user device UD1. For example, the third-party server device can provide the second credential to user device UD1 via the application. In this way, user device UD1 can receive a credential from the third-party server device that enables user device UD1, or another device, to securely request account information from the third-party server device or another device.

As shown in FIG. 1C, and by reference number 160, user device UD1 can use the application to connect to user device UD2 (e.g., associated with a customer service representative) during the application session and can provide the second credential to user device UD2 (e.g., to permit user device UD2 to request account information from the third-party server device). For example, user device UD1 can make a call to user device UD2 from the application and using web real-time communication (WebRTC), or another set of protocols that permit real-time communications over a peer-to-peer connection. In some implementations, user device UD1 can connect to user device UD2 via a gateway (not shown), such as a WebRTC gateway, that can authenticate the second credential from user device UD1 prior to user device UD1 connecting to user device UD2. Additionally, or alternatively, user device UD1 can connect to user device UD2 via one or more devices not shown in FIG. 1C, such as the IVR system, a call router, or an automatic call distribution (ACD) device. This increases security by reducing or eliminating man-in-the-middle attacks.

In this way, user device UD1 can use the application to connect to user device UD2 within the same application session that was used to authenticate the user of user device UD1. This increases security because the application has information to confirm that the user of user device UD1 has been authenticated. In addition, this permits user device UD2 to provide information for display indicating that a user of user device UD1 has been authenticated, thereby increasing security.

As shown by reference number 165, user device UD2 can request account information from the third-party server device (or another device) using the second credential. For example, user device UD2 can provide the second credential with the request for the account information. In some cases, user device UD1 can request the account information using the second credential (e.g., in association with, or rather than, user device UD2 requesting the account information). As shown by reference number 170, the third-party server device can authenticate the second credential. For example, the third-party server device can determine whether the received second credential matches information identifying generated second credentials and/or that the second credential has not expired. As shown by reference number 175, the third-party server device can provide the requested account information to user device UD2 (e.g., after authenticating the second credential).

As shown by reference number 180, user device UD2 can provide the account information to user device UD1, via the application, for display via a display of user device UD1. Additionally, or alternatively, user device UD2 can provide the account information to a device of support personnel so as to permit the support personnel to view the account information of the user so as to facilitate providing support services.

In this way, implementations described herein increase security of providing sensitive information to an IVR system, or another device, and reduce or eliminate particular threats to communications with the IVR system, or the other device, such as man-in-the-middle-attacks. Furthermore, implementations described herein increase ease of providing sensitive information to the IVR system, or the other device, thereby increasing efficiency. Furthermore, implementations described herein increase confidence that the person providing the sensitive information is the owner of the sensitive information.

As indicated above, FIGS. 1A-1C are provided merely as an example. Other examples are possible and can differ from what was described with regard to FIGS. 1A-1C.

FIG. 2 is a diagram of an example environment 200 in which systems and/or methods, described herein, can be implemented. As shown in FIG. 2, environment 200 can include a user device 210, a third-party server device 220, an IVR system 230, and a network 240. Devices of environment 200 can interconnect via wired connections, wireless connections, or a combination of wired and wireless connections.

User device 210 includes one or more devices capable of receiving, generating, storing, processing, and/or providing information associated with an account (e.g., a user account or a device account). For example, user device 210 can include a communication and/or computing device, such as a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, user device 210 can authenticate user device 210 and/or a user of user device 210, as described elsewhere herein. Additionally, or alternatively, user device 210 can cause a secure call to be established with IVR system 230, after authenticating user device 210 and/or the user, using an application installed on user device 210, as described elsewhere herein.

Third-party server device 220 includes one or more devices capable of receiving, generating, storing, processing, and/or providing information related to authenticating user device 210 and/or a user of user device 210. For example, third-party server device 220 can include a server (e.g., in a data center or a cloud computing environment), a data center (e.g., a multi-server micro data center), a workstation computer, a virtual machine (VM) provided in a cloud computing environment, or a similar type of device. In some implementations, third-party server device 220 can authenticate credentials received from user device 210 (e.g., to authenticate user device 210 and/or a user of user device 210), as described elsewhere herein. Additionally, or alternatively, third-party server device 220 can receive a request for information stored by third-party server device 220 (e.g., account information), and can provide the information to another device (e.g., user device 210 or IVR system 230), as described elsewhere herein.

IVR system 230 includes one or more devices that permit human-computer interactions via use of voice and/or dual-tone multi-frequency signaling tones (e.g., input via a keypad of user device 210). For example, IVR system 230 can include a user device, a client device, a server device, a voice response unit (VRU), or a similar type of device. In some implementations, IVR system 230 can receive a secure call from user device 210 (e.g., via an application of user device 210), as described elsewhere herein. Additionally, or alternatively, IVR system 230 can obtain information (e.g., account information) related to user device 210 and/or a user of user device 210 from third-party server device 220, as described elsewhere herein.

Network 240 includes one or more wired and/or wireless networks. For example, network 240 can include a cellular network (e.g., a long-term evolution (LTE) network, a code division multiple access (CDMA) network, a 3G network, a 4G network, a 5G network, or another type of advanced generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
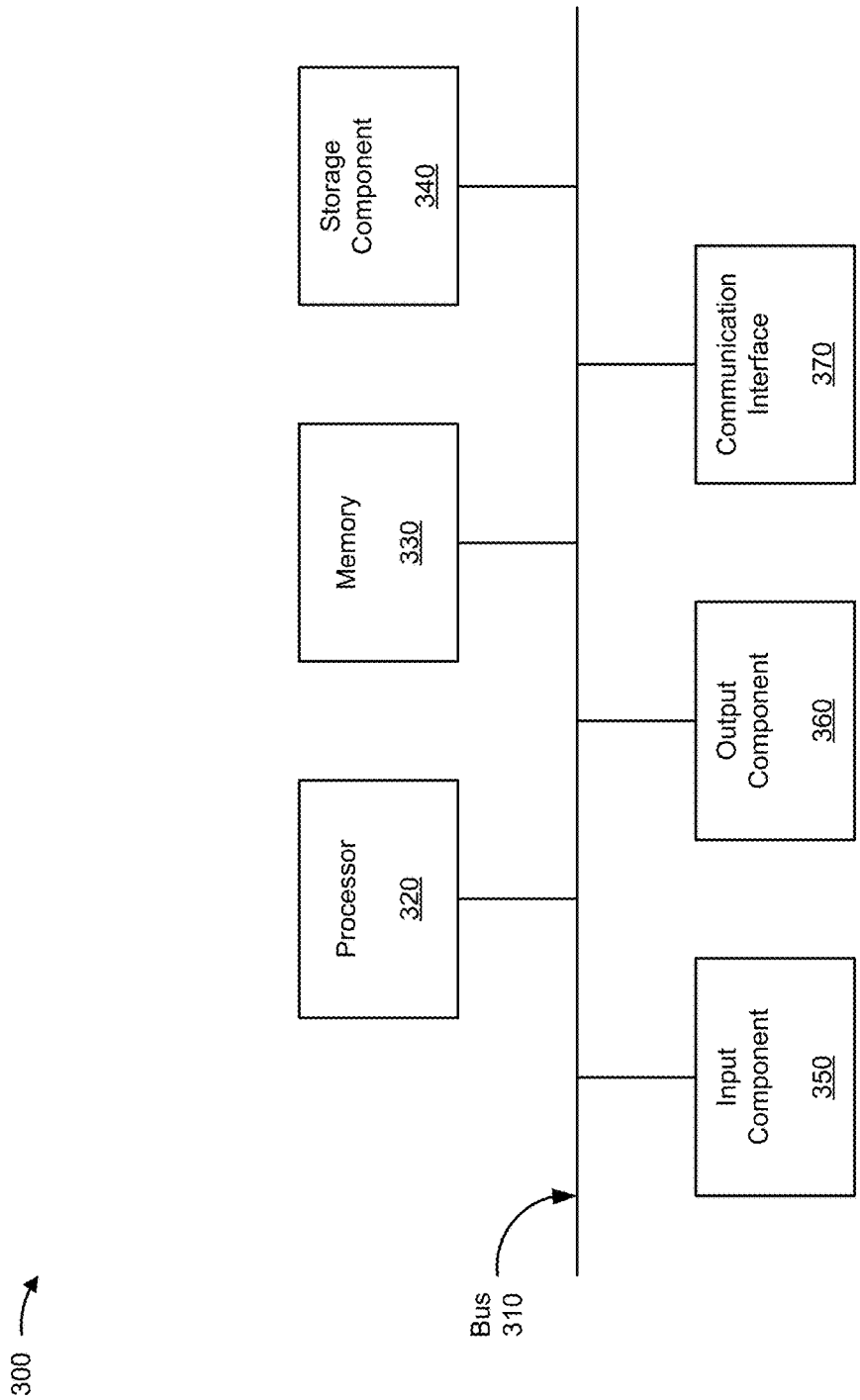
FIG. 3 is a diagram of example components of one or more devices of FIG. 2.

FIG. 3 is a diagram of example components of a device 300. Device 300 can correspond to user device 210, third-party server device 220, and/or IVR system 230. In some implementations, user device 210, third-party server device 220, and/or IVR system 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
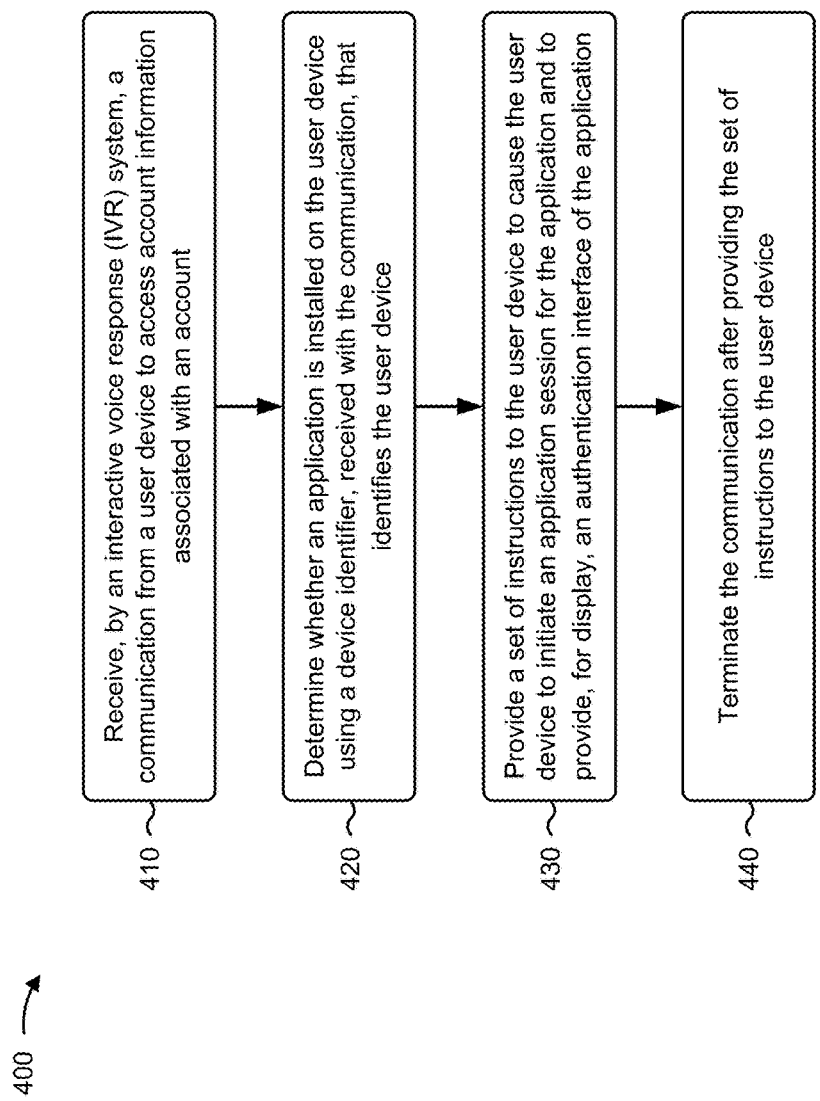
FIG. 4 is a flow chart of an example process for IVR call authentication.

FIG. 4 is a flow chart of an example process 400 for IVR call authentication. In some implementations, one or more process blocks of FIG. 4 can be performed by IVR system 230. In some implementations, one or more process blocks of FIG. 4 can be performed by another device or a group of devices separate from or including IVR system 230, such as user device 210, and/or third-party server device 220.

As shown in FIG. 4, process 400 can include receiving, by an interactive voice response (IVR) system, a communication from a user device to access account information associated with an account (block 410). For example, IVR system 230 can receive a communication from user device 210 to access account information associated with an account of user device 210 and/or a user of user device 210.

In some implementations, IVR system 230 can receive the communication periodically, according to a schedule, based on a user of user device 210 initiating the communication, based on IVR system 230 requesting the communication, and/or the like. In some implementations, a communication can include a telephone call, a message (e.g., a text message or a short message services (SMS) message), an email, and/or the like.

In some implementations, account information can include information associated with an account (e.g., an account of a user of user device 210 or an account associated with user device 210). For example, the account information can include information for a bank account, an investment account, an insurance policy account, a telecommunications service account, an account with a government entity, and/or the like.

In some implementations, the communication can include information identifying a particular user device 210 from which the communication originated. For example, the communication can include a device identifier, such as an identifier for automatic number identification (ANI), an international mobile equipment identifier (IMEI), an integrated circuit card identifier (ICCID), a subscriber identity module identifier (SIM ID), an international mobile subscriber identifier (IMSI), a mobile directory number (MDN), and/or the like.

In this way, IVR system 230 can receive a communication from user device 210 to access account information associated with an account, and IVR system 230 can identify a source from which the communication originated.

As further shown in FIG. 4, process 400 can include determining whether an application is installed on the user device using a device identifier, received with the communication, that identifies the user device (block 420). For example, IVR system 230 can determine whether an application is installed on user device 210 using a device identifier that identifies user device 210. In some implementations, IVR system 230 can determine whether the application is installed on user device 210 using a device identifier received with the communication. In some implementations, the application can include a particular application to be used to access the account information.

In some implementations, an application can include a software program designed to perform a group of coordinated functions, tasks, or activities (e.g., a word processor, a mobile banking application, a web browser, or a media player). In some implementations, IVR system 230 can perform a comparison of the device identifier and information in a data structure to determine whether a particular application is installed on user device 210. For example, the data structure can include information identifying various user devices 210 and corresponding indicators as to whether the particular application is installed on user device 210. This conserves processing resources that would otherwise be used to attempt to have the user authenticate via the application when the application is not installed on user device 210.

In some implementations, if IVR system 230 determines that the application is not installed on user device 210, then user device 210 can proceed with authentication via IVR system 230 (e.g., using voice and/or touch tone commands input by a user of user device 210). Additionally, or alternatively, IVR system 230 can prompt user device 210 to install the application, so as to permit a user of user device 210 to authenticate via the application. Additionally, or alternatively, IVR system 230 can automatically direct user device 210 to a storage location where user device 210 can download the application. Additionally, or alternatively, IVR system 230 can cause the application to be pushed (e.g., automatically downloaded) to user device 210.

In some implementations, if IVR system 230 determines that the application is installed on user device 210, then IVR system 230 can proceed with authentication via the application, as described with regard to block 430. Additionally, or alternatively, IVR system 230 can request that the user of user device 210 indicate whether the user wants (e.g., desires) to proceed with authentication via the application or via IVR system 230, and can proceed based on a response input by the user. This conserves processing resources of IVR system 230 by preventing IVR system 230 from attempting to have the user authenticate via the application in situations where the user does not desire to authenticate via the application. In addition, this improves a user experience by preventing IVR system 230 from having the user authenticate via the application when the user does not want to authenticate via the application.

In this way, IVR system 230 can determine whether an application is installed on user device 210 using a device identifier that identifies user device 210.

As further shown in FIG. 4, process 400 can include providing a set of instructions to the user device to cause the user device to initiate an application session for the application and to provide, for display, an authentication interface of the application (block 430). For example, IVR system 230 can provide a set of instructions to user device 210 to cause user device 210 to initiate an application session for the application and to provide an authentication interface for display on user device 210. For example, IVR system 230 can cause user device 210 to initiate the application session by initiating the application, waking the application up, executing the application, and/or the like. In some implementations, an application session can be defined as a state for an application that begins when the application starts and ends when the application exits. In some implementations, an application session can be defined as a state for an application that begins after the application starts and/or ends before the application exits. In some implementations, the application session can be secure. For example, the application session can use encryption, a token, a security key, and/or the like.

In some implementations, an authentication interface can include a user interface that prompts a user of user device 210 to input a credential. In some implementations, a credential can include a username/password, a captured image of the user's face for facial recognition, a fingerprint scan, a retinal scan, a voice scan, a security key, any other information that can be used to verify an identity of the user of user device 210, or any combination of any of these forms of information. For example, user device 210 can combine multiple forms of authentication to create a credential for the user that is even more unique to the user. For example, user device 210 can obtain a fingerprint scan of the user and create a first hash value based on the fingerprint scan. User device 210 can also obtain a voice scan of the user and create a second hash value based on the voice scan. User device 210 can then combine the first hash value and the second hash value to create the credential.

In some implementations, user device 210 can provide the authentication interface for display during the application session. In some implementations, IVR system 230 can determine whether the user is proceeding with authentication via the authentication interface. For example, IVR system 230 can determine whether the user is proceeding with authentication via the authentication interface by waiting a threshold amount of time after providing the set of instructions to receive an indication that the user of user device 210 has input a credential, by receiving an indication that the user has opted in to authenticating via the authentication interface based on interacting with the authentication interface, and/or the like. In some implementations, if IVR system 230 determines that the user is not proceeding with authentication via the authentication interface, IVR system 230 can instruct the user to proceed with authentication via voice and/or touch tone commands. In this way, IVR system 230 conserves processing resources that would be used to repeatedly attempt to have the user use the authentication interface when the user has no desire to use the authentication interface.

In this way, IVR system 230 can provide a set of instructions to user device 210 to cause user device 210 to initiate an application session for the application and provide, for display, an authentication interface of the application.

As further shown in FIG. 4, process 400 can include terminating the communication after providing the set of instructions to the user device (block 440). For example, IVR system 230 can terminate the communication after providing the set of instructions to user device 210. In some implementations, when the communication is a telephone call, IVR system 230 can terminate the telephone call with user device 210, such as by disconnecting the telephone call, closing a line used for the telephone call, and/or the like. In this way, IVR system 230 can terminate the communication after providing the set of instructions to user device 210.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
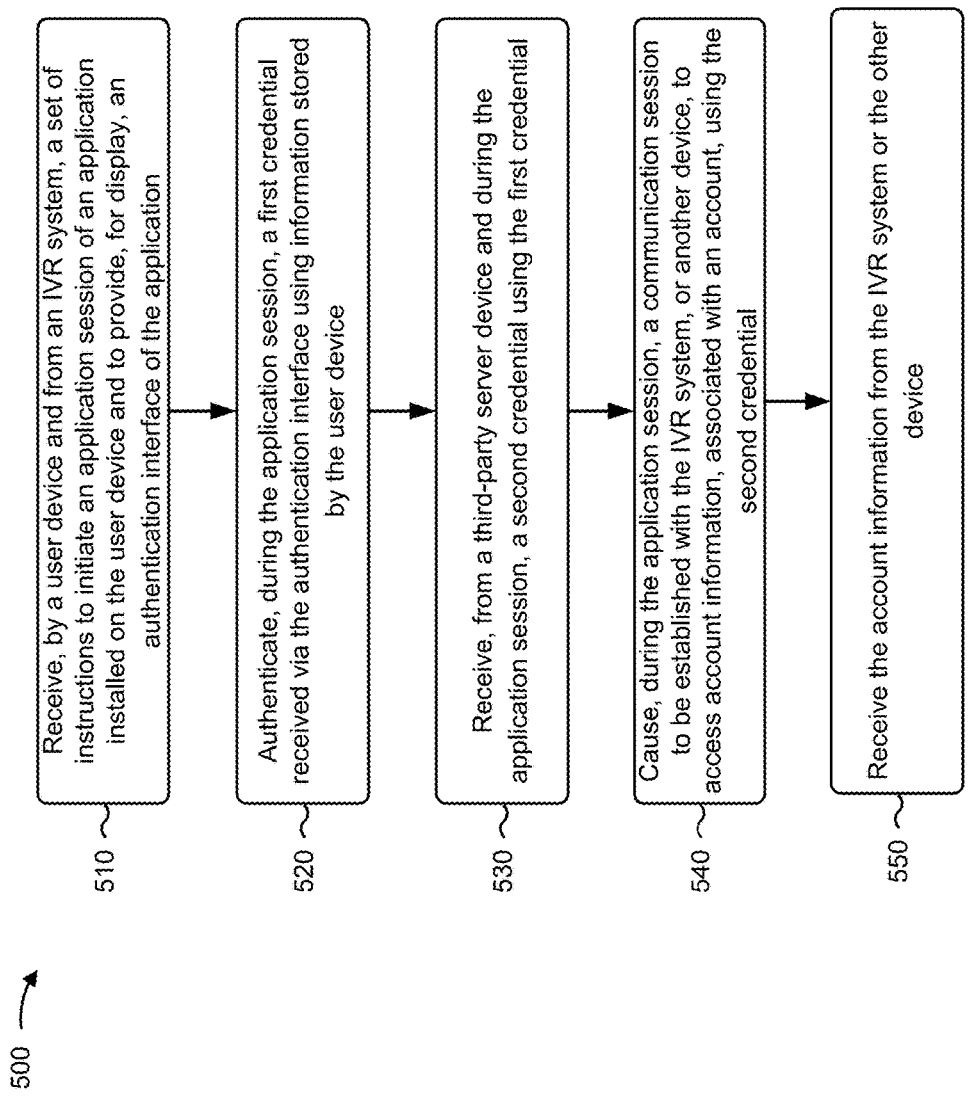
FIG. 5 is a flow chart of an example process for IVR call authentication.

FIG. 5 is a flow chart of an example process 500 for IVR call authentication. In some implementations, one or more process blocks of FIG. 5 can be performed by user device 210. In some implementations, one or more process blocks of FIG. 5 can be performed by another device or a group of devices separate from or including user device 210, such as third-party server device 220 and/or IVR system 230.

As shown in FIG. 5, process 500 can include receiving, by a user device and from an IVR system, a set of instructions to initiate an application session of an application installed on the user device and to provide, for display, an authentication interface of the application (block 510). For example, user device 210 can receive, from IVR system 230, a set of instructions to initiate an application session of an application installed on user device 210 and to provide, for display on user device 210, an authentication interface of the application. In some implementations, user device 210 can receive the set of instructions after communicating with IVR system 230, such as described above with respect to FIG. 4.

In some implementations, user device 210 can receive the set of instructions periodically, according to a schedule, based on communicating with IVR system 230, based on requesting the set of instructions from IVR system 230, and/or the like. In some implementations, user device 210 can receive the set of instructions prior to IVR system 230 terminating a communication between IVR system 230 and user device 210. In some implementations, user device 210 can receive the set of instructions when user device 210 connects to IVR system 230 via a telephone call (e.g., using a voice channel or a radio of user device 210).

In some implementations, user device 210 can initiate an application session by starting an application, and can provide an authentication interface of the application for display. For example, user device 210 can start the application and provide, for display, a login user interface to receive a username/password combination from the user, a user interface that prompts the user to take a photo of the user's face for facial recognition, a user interface that prompts the user to swipe a finger for fingerprint recognition, a user interface that prompts the user for a retinal scan, a user interface that prompts the user to speak a line of text for voice recognition, and/or the like.

In some implementations, user device 210 can wait to receive an indication as to whether a user of user device 210 is proceeding with authentication via the authentication interface. For example, user device 210 can wait a threshold amount of time, can wait for the user to interact with the authentication interface (e.g., indicate yes/no as to whether to proceed with authentication via the authentication interface), and/or the like. In some implementations, user device 210 can provide, to IVR system 230, information indicating whether the user is proceeding with authentication via the authentication interface.

In some implementations, when user device 210 receives an indication that the user does not want to authenticate via the application, user device 210 can provide the indication to IVR system 230 and can end the application session. In this way, user device 210 conserves processing resources by preventing user device 210 from continuing to attempt to have the user authenticate via the authentication interface.

In this way, user device 210 can receive a set of instructions from IVR system 230 to initiate an application session for an application and to provide an authentication interface of the application for display.

As further shown in FIG. 5, process 500 can include authenticating, during the application session, a first credential received via the authentication interface using information stored by the user device (block 520). For example, user device 210 can authenticate, during the application session, a first credential received via the authentication interface. In some implementations, user device 210 can receive the first credential from a user of user device 210 via the authentication interface prior to authenticating the first credential.

In some implementations, user device 210 can authenticate the first credential using information stored on user device 210 (e.g., stored information identifying a username/password combination of the user, a fingerprint of the user, or a security key of the user). In some implementations, user device 210 can authenticate the first credential by performing a comparison of the first credential and the stored information and determining whether the comparison indicates a match. In some implementations, user device 210 can authenticate the first credential during the application session of the application. In this way, user device 210 can authenticate, during the application session, a first credential received via the authentication interface using information stored by the user device. This increases security of providing and/or receiving account information by authenticating a user of user device 210.

As further shown in FIG. 5, process 500 can include receiving, from a third-party server device and during the application session, a second credential using the first credential (block 530). For example, user device 210 can receive, from third-party server device 220, a second credential using the first credential.

In some implementations, user device 210 can provide the first credential and/or an indication that the first credential was authenticated to third-party server device 220 when receiving the second credential. For example, user device 210 can provide the first credential to third-party server device 220 or an indication that the first credential was authenticated based on authenticating the first credential. In some implementations, user device 210 can provide the first credential, or the authentication indication, using the application. For example, user device 210 can provide the first credential, or the authentication indication, during the same application session of the application as was initiated by receiving the set of instructions from IVR system 230. This increases security of providing the first credential, or the authentication indication, by providing the first credential, or the authentication indication, during the same application session used to authenticate the user of user device 210.

In some implementations, user device 210 can receive a second credential from third-party server device 220. For example, user device 210 can receive the second credential after user device 210 sends the first credential, or the authentication indication, to third-party server device 220. In some implementations, the second credential can include a temporary credential, such as a one-time credential, a credential that is valid for a limited amount of time, an access key, a session token, and/or the like.

In some implementations, the second credential can have a limited duration. For example, user device 210, or another device, can use the second credential during the application session, for a threshold amount of time, for a particular quantity of requests for information from third-party server device 220, and/or the like. In some implementations, user device 210, or another device, can use the second credential to make requests for information from third-party server device 220. For example, user device 210, or another device, can provide the second credential to third-party server device 220 when requesting account information (e.g., to permit third-party server device 220 to authenticate the request), as described below.

In this way, user device 210 can receive, from third-party server device 220 and during the application session, a second credential using the first credential.

As further shown in FIG. 5, process 500 can include causing, during the application session, a communication session to be established with the IVR system, or another device, to access account information, associated with an account, using the second credential (block 540). For example, user device 210 can cause a communication session to be established with IVR system 230, or another device, to access account information, associated with an account of the user of user device 210 and/or associated with user device 210, using the second credential. Continuing with the previous example, the other device can include a user device 210 used by a customer support representative in a call center.

In some implementations, user device 210 can connect to IVR system 230, or another device. For example, user device 210 can connect to IVR system 230, or another device, using the application and during the application session. In some implementations, when connecting to IVR system 230, or another device, user device 210 can cause a communication session to be established with IVR system 230, or another device. For example, a first user device 210 can cause a communication to be established with a second user device 210 used by a customer support representative (e.g., via IVR system 230, a call router, or an ACD device).

In some implementations, a communication session can include an information exchange between user device 210 and IVR system 230, or another device. In some implementations, the communication session can include a telephone call. For example, user device 210 can connect to IVR system 230, or another device, via a telephone call, using the application to dial out to IVR system 230, or another device. In some implementations, when user device 210 connects to IVR system 230, or another device, via a telephone call, the telephone call can bypass voice and/or touch-tone authentication steps of IVR system 230. For example, when user device 210 causes a communication session (e.g., a telephone call) to be established with IVR system 230, or another device, user device 210 can cause the communication session to be established without further authentication (e.g., without a user of user device 210 having to input a credential via voice or touch-tone commands). Continuing with the previous example, a first user device 210 can connect to a second user device 210 used by a customer support representative without further authentication. This conserves processing resources of user device 210, IVR system 230, and/or another device, and increases an efficiency of connecting to IVR system 230, or the other device.

In some implementations, user device 210 can cause the communication session to be established during the same application session initiated by receiving the set of instructions. In this way, user device 210 increases security of the communication session by causing the communication session to be established during the same application session initiated by receiving the set of instructions and during which the first credential was authenticated.

In some implementations, when the communication session includes a telephone call, user device 210 can use a set of protocols and/or application programming interfaces (APIs) that permit real-time communication over a peer-to-peer connection. For example, user device 210 can connect to IVR system 230, or another device, using WebRTC. In some implementations, user device 210 can connect to IVR system 230, or another device, without using a voice channel or radio of user device 210, which might not be authenticated or secure. For example, user device 210 can connect to IVR system 230, or another device, as part of a data session (e.g., a session where data is exchanged) established during the application session. In this way, user device 210 increases security due to the application having verified the identity of the user of user device 210 during the same application session that is being used to connect to IVR system 230, or another device.

In some implementations, user device 210 can connect to IVR system 230, or another device, via a gateway device, such as a gateway device that provides access to network 240. For example, user device 210 can connect to IVR system 230, or another device, via a WebRTC gateway device and/or a voice over Internet protocol (VoIP) gateway device. This increases security of connecting to IVR system 230, or another device, and/or facilitates connecting to IVR system 230, or the other device.

In some implementations, when connecting to IVR system 230, or another device, via a gateway device, user device 210 can provide the second credential to the gateway device prior to connecting to IVR system 230, or the other device. For example, when dialing out to IVR system 230, or another device, user device 210 can first dial out to the gateway device and can provide the second credential to the gateway device. In some implementations, user device 210 can provide the second credential to the gateway device to permit the gateway device to authenticate user device 210 and/or a user of user device 210. For example, the gateway device can use the second credential to authenticate a telephone call from user device 210 before the telephone call reaches IVR system 230, or the other device.

In some implementations, when the gateway device authenticates user device 210 via the second credential, the gateway device can permit user device 210 to connect to IVR system 230, or any other termination, such as a customer service agent telephone (e.g., another user device 210). For example, the gateway device can permit a telephone call from user device 210 to be delivered to IVR system 230, or another device, after authenticating the second credential. In this way, user device 210 can connect to IVR system 230, or another device, via a secure gateway device and in a secure manner. Additionally, in this way, IVR system 230 and/or an operator associated with IVR system 230, or another device, can trust an identity of user device 210 and/or a user of user device 210 when user device 210 connects to IVR system 230, or another device. This increases security of IVR system 230, or another device, such as by reducing or eliminating man-in-the-middle attacks.

In some implementations, user device 210 can provide the second credential to IVR system 230, or another device, (e.g., to permit IVR system 230, or another device, to request the account information from third-party server device 220). For example, user device 210 can provide the second credential using the application and during the application session. Additionally, or alternatively, user device 210 can provide other information to IVR system 230, or another device. For example, user device 210 can provide an account identifier that identifies the account, a user identifier that identifies a user of user device 210, a device identifier, and/or the like.

In some implementations, IVR system 230, or another device, can request the account information from third-party server device 220 using the second credential. For example, IVR system 230, or another device, can provide the second credential to third-party server device 220 when requesting the account information. In this case, third-party server device 220 can authenticate the second credential and provide the requested information to IVR system 230, or another device.

Additionally, or alternatively, user device 210 can request the account information from third-party server device 220 using the second credential. This conserves processing resources of IVR system 230, or another device, by reducing or eliminating a need for IVR system 230, or the other device, to request the account information on behalf of user device 210.

In this way, user device 210 can cause, during the application session, a communication session to be established with IVR system 230, or another device, to access account information associated with an account.

As further shown in FIG. 5, process 500 can include receiving the account information from the IVR system or the other device (block 550). For example, user device 210 can receive the account information from IVR system 230, or another device, via the application and during the communication session. In some implementations, user device 210 can use the application to display the account information.

In some implementations, IVR system 230, or another device, can provide the account information after receiving the account information from third-party server device 220. For example, IVR system 230, or another device, can provide the account information to the application installed on user device 210. Additionally, or alternatively, IVR system 230, or another device, can provide the account information for display to another device. For example, IVR system 230 can provide the account information to a device of customer support personnel to permit the customer support personnel to provide customer support services to the user of user device 210.

In some implementations, user device 210, IVR system 230, and/or another device, can perform an action related to the account information. In some implementations, user device 210, IVR system 230, and/or another device, can generate a report that includes the account information (e.g., account usage information or metrics related to the account). Additionally, or alternatively, user device 210, IVR system 230, and/or another device, can schedule a meeting related to the account information. For example, user device 210 can use electronic calendars associated with the user of user device 210 and another individual, such as a bank manager, a customer representative, and/or the like to identify an available time for the user and the other individual to meet.

Additionally, or alternatively, user device 210, IVR system 230, and/or another device, can populate a form (e.g., a tax return form, an expense form, etc.) using the account information. Additionally, or alternatively, user device 210, IVR system 230, and/or another device, can initiate software related to the populated form (e.g., tax software, accounting software, etc.) and can make one or more entries in the software.

In this way, user device 210 can receive the account information from IVR system 230, or another device, in a secure manner.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Implementations described herein enable secure authentication of a customer's identity via an application installed on the customer's user device (e.g., smart phone), and enable secure reconnection of communications with an IVR system, or another device, via the application. In this way, implementations described herein increase security of providing sensitive information to the IVR system, or the other device, and reduce or eliminate particular threats to communications with an IVR system, or the other device, such as man-in-the-middle-attacks. Furthermore, implementations described herein increase ease of providing of sensitive information to the IVR system, or the other device, thereby increasing efficiency. Furthermore, implementations described herein increase confidence that the person providing the sensitive information is the owner of the sensitive information, thereby increasing security.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
connect, to an interactive voice response (IVR) system, via a telephone call;
receive, from the IVR system, a set of instructions to initiate an application session of an application and to provide an authentication interface for display, the application being installed on the device, the authentication interface being associated with the application;
provide an indication to the IVR system that a user wants to authenticate via the application stored on the device;
receive, via the authentication interface and during the application session and in response to the indication, a first credential from the user of the device after providing the authentication interface for display, the first credential to be used to authenticate the user;
authenticate, during the application session, the user of the device based on receiving the first credential;
receive, from a third-party server device and during the application session, a second credential based on authenticating the user of the device using the first credential,
the second credential to be used to request account information from the third-party server device,
the account information being associated with an account of the device or the user;
cause, during the application session, a communication session to be established with the IVR system to request the account information based on receiving the second credential,
the communication session including another telephone call established between the application to the IVR system;
receive the account information from the IVR system via the communication session; and
provide the account information for display via a display of the device based on receiving the account information.

2. The device of claim 1, where the one or more processors, when causing the communication session to be established, are to:
cause the communication session to be established without using a voice channel or a radio of the device based on receiving the second credential.

3. The device of claim 1, where the one or more processors, when causing the communication session to be established, are to:
cause the communication session to be established using a web real-time communication (WebRTC) protocol or a WebRTC application programming interface (API).

4. The device of claim 1, where the first credential includes at least one of:
a username and password combination,
a fingerprint scan from the user,
an image of the user,
a voice scan of the user, or
a retinal scan of the user.

5. The device of claim 1, where the second credential includes at least one of:
a temporary credential,
a one-time credential,
an access key,
a credential that is valid for only a particular amount of time, or
a session token.

6. The device of claim 1, where the telephone call is established as part of a data session of the application.

7. A non-transitory computer-readable medium storing instructions, the instructions comprising:
one or more instructions that, when executed by one or more processors, cause the one or more processors to:
connect, to an interactive voice response (IVR) system, via a telephone call;
receive, from the IVR system, a set of instructions to initiate an application session of an application installed on a user device and to provide an authentication interface for display via a display of the user device,
the authentication interface being associated with the application;
provide an indication to the IVR system that a user of the user device wants to authenticate via an application stored on the user device;
receive, via the authentication interface and during the application session and in response to the indication, a first credential from the user of the user device after providing the authentication interface for display,
the first credential being associated with authenticating the user or the user device;
authenticate, during the application session, the user or the user device based on receiving the first credential;
receive, from a third-party server device and during the application session, a second credential based on authenticating the user or the user device using the first credential,
the second credential being associated with requesting account information,
the account information being associated with the user device or the user;
cause, during the application session, a communication session to be established with the IVR system to request the account information based on receiving the second credential,
the communication session including another telephone call established between the application and the IVR system without using a voice channel or a radio of the user device;
receive the account information from the IVR system via the communication session; and
provide the account information for display via the display of the user device based on receiving the account information.

8. The non-transitory computer-readable medium of claim 7, where the one or more instructions, that cause the one or more processors to authenticate the first credential, further cause the one or more processors to:
authenticate the user or the user device by comparing the first credential to information stored by the user device.

9. The non-transitory computer-readable medium of claim 7, where the one or more instructions, when executed by the one or more processors, further cause the one or more processors to:
provide the second credential to the IVR system to permit the IVR system to obtain the account information; and
where the one or more instructions, that cause the one or more processors to receive the account information, cause the one or more processors to:
receive the account information based on providing the second credential to the IVR system.

10. The non-transitory computer-readable medium of claim 7, where the one or more instructions, when executed by the one or more processors, further cause the one or more processors to:
connect to the IVR system via the telephone call using the voice channel or the radio of the user device; and
receive another indication that the IVR system has terminated the telephone call after providing the indication to the IVR system.

11. The non-transitory computer-readable medium of claim 7, where the one or more instructions, when executed by the one or more processors, further cause the one or more processors to:
provide the first credential to the third-party server device based on authenticating the user or the user device using the first credential; and
where the one or more instructions, that cause the one or more processors to receive the second credential, cause the one or more processors to:
receive the second credential based on providing the first credential to the third-party server device.

12. The non-transitory computer-readable medium of claim 7, where the one or more instructions, when executed by the one or more processors, further cause the one or more processors to:
receive a support service from a device associated with customer support personnel based on causing the communication session to be established with the IVR system.

13. A method, comprising:
connecting, by a device, to an interactive voice response (IVR) system via a telephone call;
receiving, by the device and from the IVR system, a set of instructions to initiate an application session of an application and to provide an authentication interface for display,
the application being installed on the device,
the authentication interface being associated with the application,
the application session to be used to securely connect to the IVR system;
providing, by the device, an indication to the IVR system that a user of the device wants to authenticate via the application stored on the device;
receiving, by the device and during the application session and in response to the indication, a first credential from the user of the device after providing the authentication interface for display,
the first credential to be used to authenticate the user,
the first credential being received via the authentication interface;
authenticating, by the device and during the application session, the user of the device based on receiving the first credential;
receiving, by the device and during the application session, a second credential from a third-party server device based on authenticating the user of the device using the first credential,
the second credential to be used to request account information from the third-party server device,
the account information being associated with an account of the device or the user;
causing, by the device and during the application session, a communication session to be established with the IVR system to request the account information based on receiving the second credential;
receiving, by the device and during the application session, the account information from the IVR system via the communication session; and
providing, by the device, the account information for display via a display of the device based on receiving the account information.

14. The method of claim 13, further comprising:
providing the authentication interface for display based on receiving the set of instructions;
determining whether the user has indicated a desire to authenticate via the authentication interface within a threshold amount of time based on providing the authentication interface for display; and
where authenticating the user of the device based on the first credential comprises:
authenticating the user of the device based on determining that the user has indicated a desire to authenticate via the authentication interface within the threshold amount of time.

15. The method of claim 13, further comprising:
performing a comparison of the first credential and information stored by the device based on receiving the first credential; and
where authenticating the user of the device based on the first credential comprises:
  authenticating the user of the device based on a result of performing the comparison of the first credential and the information stored by the device.

16. The method of claim 13, further comprising:
requesting the account information using the second credential based on receiving the second credential.

17. The method of claim 13, further comprising:
providing a device identifier to the IVR system prior to receiving the set of instructions,
  the device identifier identifying the device,
  the device identifier permitting the IVR system to determine whether the device has the application installed; and
where receiving the set of instructions comprises:
  receiving the set of instructions based on providing the device identifier to the IVR system.

18. The method of claim 13, where causing the communication session to be established comprises:
causing the communication session to be established without authenticating the device via the IVR system.

19. The device of claim 1, where the one or more processors are further to:
receive a support service from a device associated with customer support personnel based on causing the communication session to be established with the IVR system.

20. The method of claim 13, where the communication session includes another telephone call established between the application and the IVR system.

* * * * *